Aug. 2, 1960　　　J. A. WOOD　　　2,947,565
GENERAL PURPOSE TRAILER
Filed Dec. 21. 1956　　　　　　　4 Sheets-Sheet 1

INVENTOR
JOHN ALLEN WOOD
BY
ATTORNEY

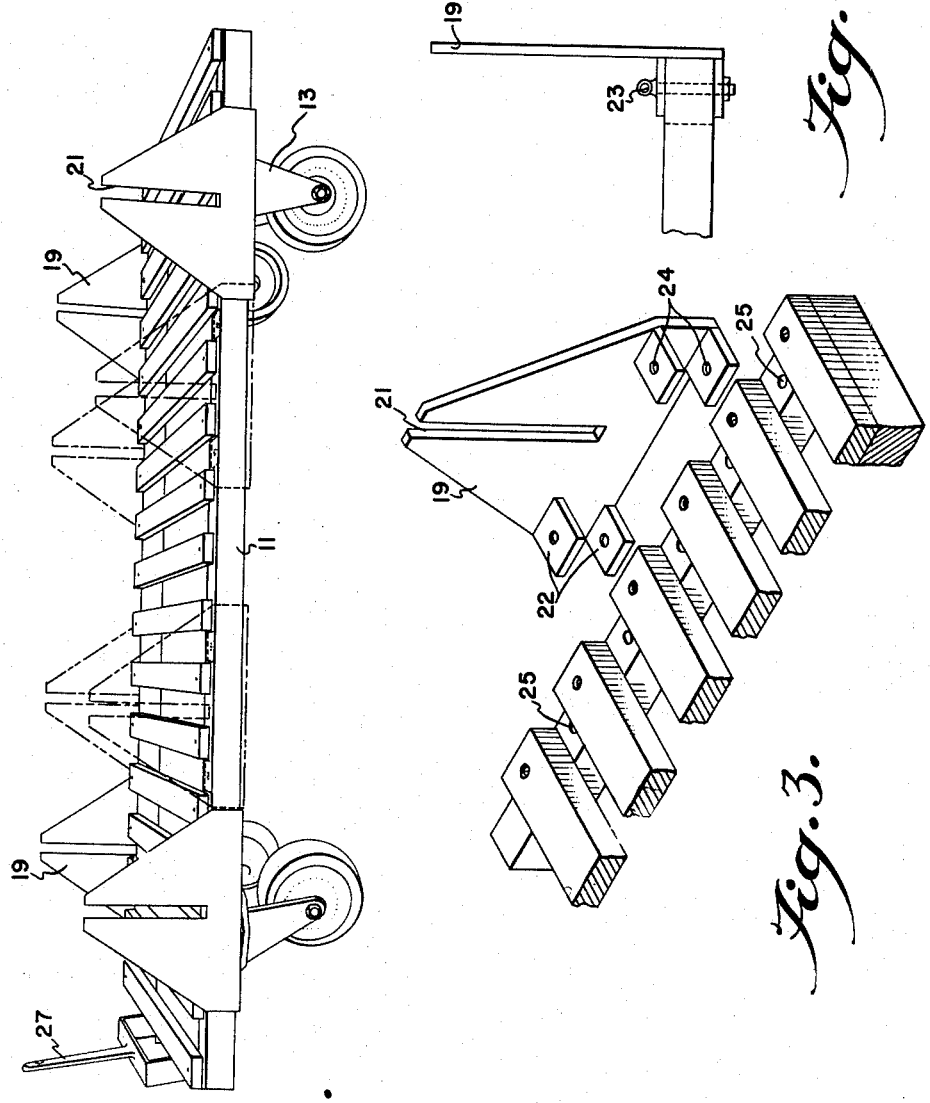

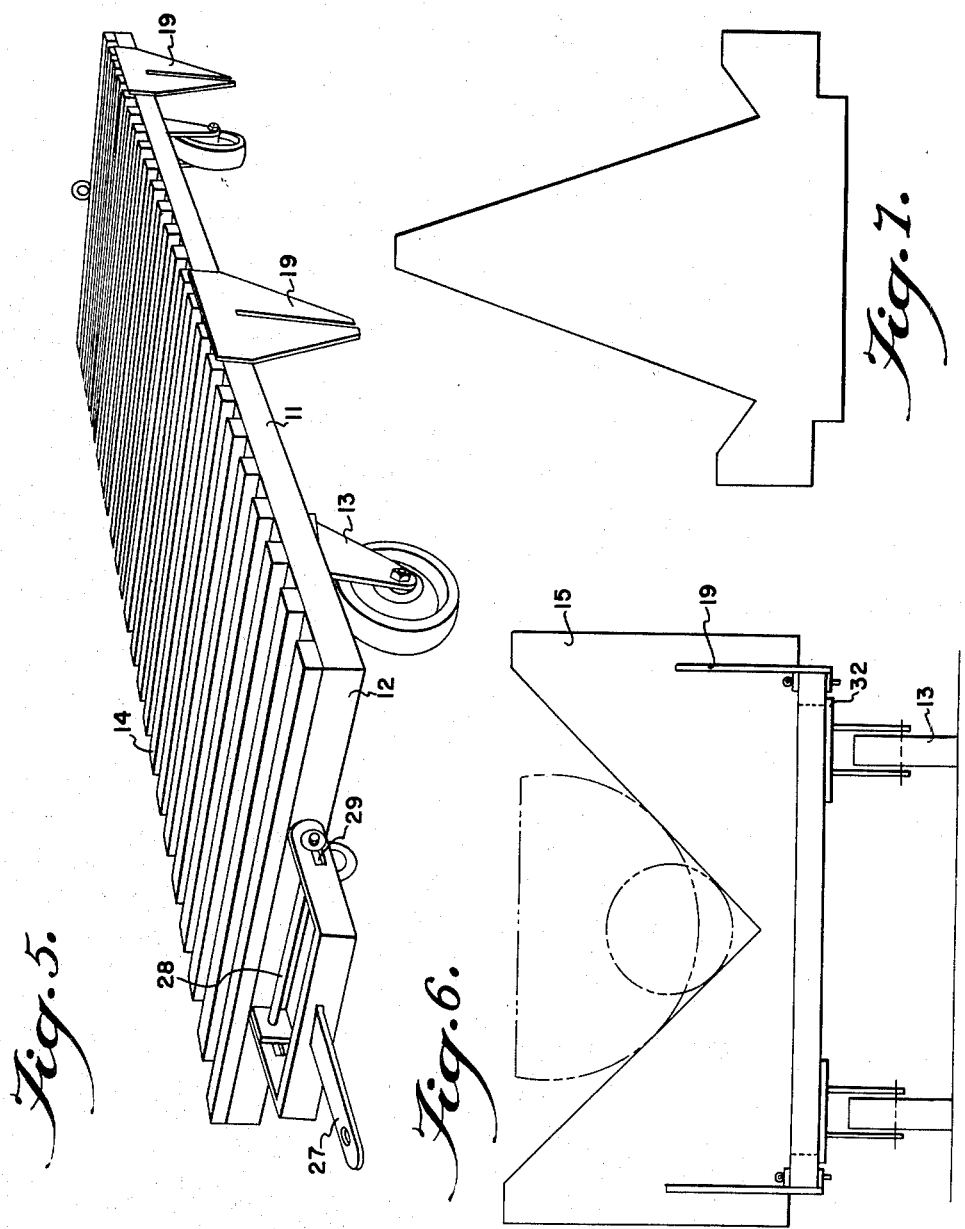

Aug. 2, 1960 J. A. WOOD 2,947,565
GENERAL PURPOSE TRAILER
Filed Dec. 21. 1956 4 Sheets-Sheet 4

INVENTOR
JOHN ALLEN WOOD
BY
ATTORNEY

United States Patent Office

2,947,565
Patented Aug. 2, 1960

2,947,565

GENERAL PURPOSE TRAILER

John Allen Wood, Baltimore, Md., assignor to The Martin Company, Middle River, Md., a corporation of Maryland Filed Dec. 21, 1956, Ser. No. 629,868

7 Claims. (Cl. 296—3)

This invention relates to a general purpose vehicle and more particularly to a trailer or truck having interchangeable portions enabling it to be quickly adaptable to the hauling of assemblies of unusual shape and contour, as well as for the carrying of ordinary loads.

In the past, when an irregularly shaped object such as a wingtip tank, an aileron, or other portion of aircraft structure, for example, was to be hauled from one location to another in an aircraft factory, it was usually necessary to construct a truck or trailer especially designed and prepared for hauling that particular item. It was frequently found that in the vicinity of 100 man hours were required to design and construct such a vehicle, and then after that particular object had been hauled, the vehicle was typically removed from the transportation system of the plant and set off to one side in the expectation that it would again be called upon to haul an object of such a configuration. Since such vehicles were idle for a great percentage of the time, they were, for all intents and purposes, "lost" to the transportation system of the plant, and it was necessary, therefore, to maintain a larger fleet of trailers in the transportation system than would have been necessary had all of the vehicles been readily available to perform general hauling services as required.

According to the present invention, a trailer is provided having easily adaptable and/or replaceable portions enabling it readily to be converted for hauling a great variety of objects of unusual shape and contour. This is made possible through the use of removable headers or brackets located at fore and aft positions on the trailer, upon which headers the load may be carried. The headers can be supplied in a variety of configurations, and may be placed at locations on the trailer so as best to conform to the length of the load carried. With this arrangement, the transportation system of an industrial plant may be operated with a minimum number of trailers. Because of the greater adaptability of trailers according to this invention it is unnecessary to sideline a trailer merely because it has just been utilized for hauling an object of unusual configuration. It is, of course, to be understood that a trailer or truck according to this invention may have wide application, and in no sense be confined to use in the aircraft industry.

More specifically, a trailer according to this invention may have structural side members, header supporting means, and removable load-carrying headers located in substantially upright position in fore and aft locations on the trailer. By maintaining a plurality of pairs of load-carrying headers available, it is possible to haul objects of various contour merely by selecting the headers that will conform to the configuration of the load to be carried.

For example, if a wingtip tank is to be transported, a header having a rounded upper central portion might be selected to receive the large rounded portion of the tank, whereas a header having a comparatively small notch therein would probably be selected to receive the smaller, highly tapered portion of the tank. As a further example, if a cylindrically shaped object is to be transported, headers of substantially V-shaped configuration may be employed, for such a configuration is usually satisfactory for carrying objects of such shape, and in general V-shaped headers are quite versatile in their application. By utilizing headers of thick plywood, for example, the headers can be custom fitted to the object (by the use of a bandsaw) in a comparatively short period of time if it be necessary that the headers closely conform to the load, such as for the reason of preventing undesired shifting of the object about its longitudinal axis while in transit.

In the event that smaller items are to be carried, each pair of headers employed could be notched in several locations so that numerous items such as tubing and frame members extending between the headers may be carried.

The trailer may be provided with a plurality of flooring members spaced apart and extending between the structural side members to constitute a platform portion, and the header supporting means may be in the form of pairs of side pieces provided fore and aft to stabilize the headers in the desired upright position on the trailer. Each side piece may be provided with attachment fittings so that it may be either installed in an upright position functioning to stabilize the header, or placed in an inverted, non-functional position on the trailer body when no headers are being employed, to leave the platform of the trailer entirely obstructed so that large flat loads may be carried.

The invention will be further described in connection with the accompanying drawings which illustrate a preferred embodiment of the invention. However, it is to be understood that such further disclosure is by way of exemplification and the invention is not limited thereby, but only to the extent set forth in the appended claims.

In the drawings:

Figure 2 is a side view in perspective of the truck showing in full lines typical placement of the side pieces, but also illustrating by the use of broken lines, possible alternate locations of the side pieces;

Figure 3 is a fragmentary view to a larger scale showing details of a typical side piece and how it is adapted to be fitted onto the structural member of the truck;

Figure 4 is a view similar to Figure 3, but showing an end view of the side piece and the use of a pin to secure the side piece to the body of the truck;

Figure 5 is a three-quarter perspective view of a truck with the side pieces secured in inverted position so that the platform of the truck may be utilized for the hauling of flat objects, for example;

Figure 6 is an end view of the truck to slightly larger scale, showing a header of V configuration in place in the side pieces, and illustrating by means of broken lines how such a header may be employed for carrying cylindrical objects, as well as boat-shaped objects; and Figures 7 through 13 are illustrative of other header configurations such as may be used with the truck according to this invention.

Figure 1:
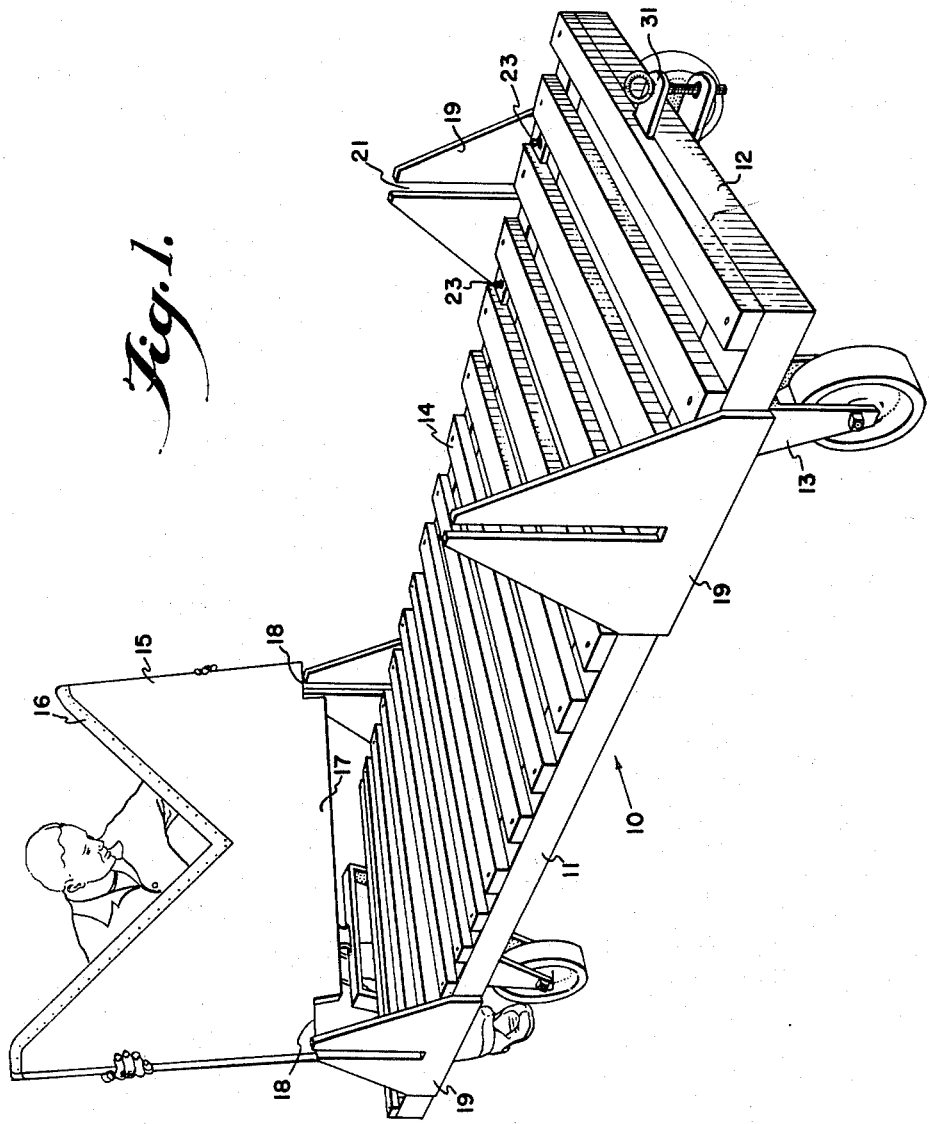
Figure 1 is a three-quarter perspective view of a general purpose truck according to this invention illustrating the manner in which a header may be inserted between a pair of aligned side pieces.

Referring now to Figure 1, a trailer 10, which otherwise may be referred to as a truck is illustrated, having structural side members 11 and end members 12. As an example, the structural members may be of three inch square steel tubing or the like, and the truck generally of rugged construction, and capable of carrying quite heavy loads. Wheels 13 are mounted at appropriate locations on the underside of the truck, and as an example, may be approximately 10 in. in diameter and equipped with rubber tires. However, it is to be understood that this invention is broad enough to comprehend utilization with trucks having large wheels and even with trucks equipped with a powerplant, as well as with trucks having wheels of the type illustrated in the drawings. In trucks of the type illustrated, it is preferred that the rear wheels be fixed, and the front wheels castered so that the truck may execute comparatively sharp turns.

The upper surface or platform of the truck may be constructed of a number of spaced flooring members 14 securely bolted to the structural side members 11. As an example, the flooring members 14 may be of maple approximately 1½ in. thick, 3 in. wide, and of a length conforming to the width of the truck, which may be 4 ft. wide. As a further example, the truck body may be in the vicinity of 8 feet to 12 feet long.

According to this invention, removable headers or brackets 15 may be employed at fore and aft locations on the truck, with each header having a configuration such that it can effectively be used for hauling a load of a particular contour. As shown in Figure 1, the header 15 may be of a generally V-shaped configuration, and be equipped with padding 16 to prevent injury to the item to be transported. The header 15 is of a dimension such that it will fit within the contour of the truck, and may be of a thickness approximately conforming to the spacing of the flooring members 14. For the purpose of providing stability, each header may be provided with a lower portion 17 that can extend down between two adjacent flooring members, the lower portion having cutouts 18 at each lower end so that the header can rest directly on the structural side members 11 of the truck body.

For the purpose of providing additional stability, side pieces or plates 19 may be utilized at fore and aft locations on the truck, with each of the side pieces being equipped with a slot 21 to receive one end portion of a header 15. On the lower inner side of each side piece are attachment fittings 22, which may be utilized in pairs, spaced in the vertical direction for a distance conforming to the thickness dimension of the structural side members 11. The pairs of fittings may be spaced apart in the horizontal direction a distance corresponding to the center to center distance of two alternate flooring members 14. Note Figures 1 through 3. Therefore, by inserting a side piece 19 on a structural side member 11 of the truck, the attachment fittings 22 will closely fit upon the side member 11 between flooring members 14 and by the use of a pin 23 inserted through each set of mating holes 24 and 25 on the fittings and side pieces, respectively, each side piece may be securely fastened to the truck. As should be apparent from Figure 2, the side pieces may be moved to a variety of positions on the truck body, for between each two adjacent flooring members, a hole 25 is provided in each side member 11, so that the side pieces 19 may be moved to positions on the truck to best accommodate the length of the load being carried. As will be noted from Figures 2 and 3, the slot 21 in each side piece is so located that it will always be substantially in alignment with the space between the pair of flooring members that are located between the pairs of attachment fittings 22 of that side piece. Therefore, by moving the side pieces to the desired locations on the truck and placing them in opposed, aligned relation on the side members 11, the headers 15 may be received by the side pieces in such a manner that the lower portions 17 will extend down between the flooring members, thereby resulting in very stable positioning of the headers on the truck.

A tongue 27 may be provided on the front end of the truck so that if desired it may be pulled by a suitable powered vehicle, and the tongue may be secured to the forward structural member 12 by the use of a bolt 28.

At the locations in which the tongue is attached to the bolt, slots 29 may be provided in each side member of the tongue so that when not in use, the tongue may easily be maintained in the vertical, out-of-the-way position illustrated in Figures 1 and 2. On the rear structural member of the truck a suitable towing fixture 31 may be provided so that another truck may be attached behind.

As previously mentioned, castered wheels may be employed at the front of the truck to permit turns of small radius. Additional structural members (not shown) may be provided on the underside of the truck intermediate the side pieces 11, so as to serve to support the wheels in positions somewhat inboard of the side members 11. As may be desired, each wheel is secured to a mounting plate 32 that is supported by such an additional structural member.

Referring to Figure 5, a truck according to this invention is illustrated in the manner in which it may be utilized for carrying large flat objects, such as sheet metal or the like. The headers have, of course, been removed, and the side pieces 19 mounted in inverted, nonfunctional positions on the side members 11 where they will be readily accessible for the next occasion in which they are to be utilized for stabilizing headers. This manner of mounting of the side pieces is made possible by the fact that the attachment fittings 22 (see Fig. 3) are so placed that the side pieces may be mounted upright or in the inverted position with equal facility.

The V-shaped configuration of header as illustrated in Figs. 1 and 6 is generally adaptable to the hauling of various types of objects, and as shown in broken lines in Figure 6, either cylindrical or hull shaped objects may be carried in headers of such configuration.

Additional header configurations are shown in Figs. 7 through 13, and as should be obvious, a plurality of pairs of headers may be maintained in an industrial plant so that the truck or trucks of the transportation system may be quickly converted from the hauling of one type of item to another.

Figure 8:
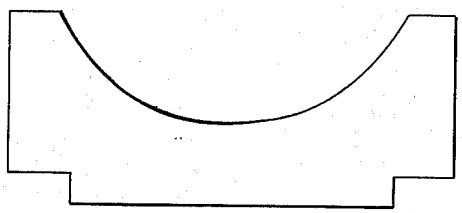

As an example of the utility of the various load-carrying headers, the A-frame header illustrated in Fig. 7 may be utilized for the hauling of sheet stock or doors, whereas the header of the type shown in Figure 8 may be utilized to haul a wingtip tank, a bomb bay door, a tail cone for jet engine, or the like. By utilizing headers of one inch thick plywood, for example, a header can quickly be sawed so that it will conform precisely to the contour of the item to be carried.

Figure 9:
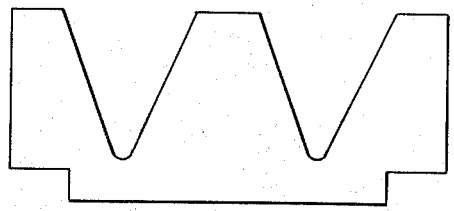
Figure 12:
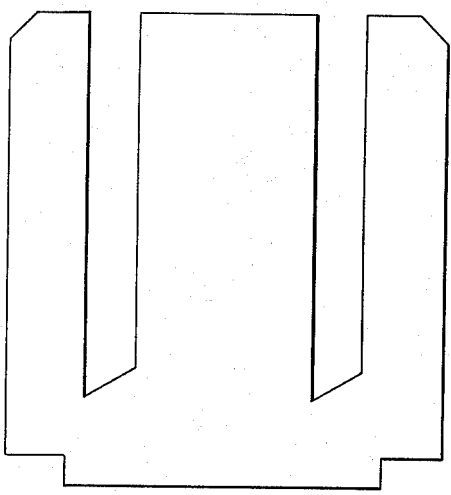
Figure 10:
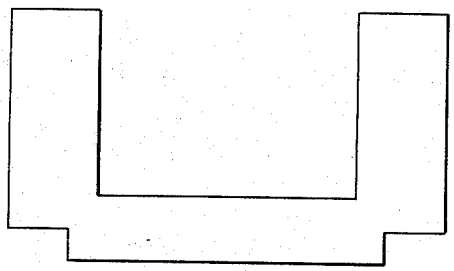
Figure 13:
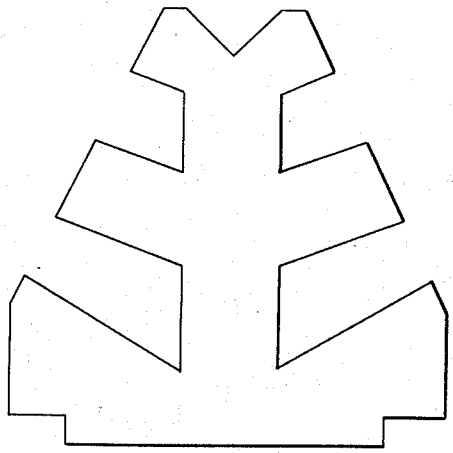
Figure 11:
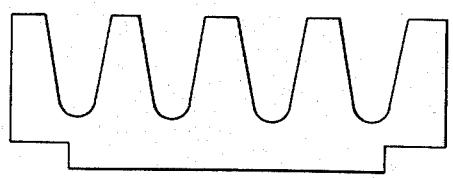

The headers of Figs. 9 and 11 having a plurality of notches may be utilized for the transportation of leading edges, ailerons, flaps or the like, on which occasions they would, of course, be appropriately padded. The header of the type illustrated in Fig. 10 may be utilized for the transportation of heavy, bulk tubing, whereas the header of Fig. 12 may be utilized for the carrying of wing sections, for example. Small tubing, bent shapes and extrusions may be carried in the several notches of headers of the type illustrated in Fig. 13.

By the use of this invention it is to be seen that the transportation system of an industrial plant may be maintained in an efficient operating status utilizing a minimum number of trucks, for the trucks of the system can, according to this invention, be converted quickly from flat bed trucks to trucks adapted for the transportation of objects of unusual or complicated configuration. According to the basic concept of this invention, when carrying objects of unusual configuration, at most it is only necessary to custom fit the headers to conform to the contour of the items to be carried, instead of having to resort to prior art practices in which the truck was constructed in virtually its entirety along the lines of conforming it to the transportation of such an object.

As should be apparent, this invention is adaptable to being utilized throughout industry for the transportation of very heavy objects, for by employing flooring members and headers of steel, for example, and employing heavier structural frame members and a sturdier type of under-carriage, vastly greater loads may be carried.

Various changes may be made in the details of construction without departing from the spirit of the invention or sacrificing any of the advantages thereof.

I claim:

1. A universal trailer having structural side members, a plurality of flooring members spaced apart and extending between the side members to constitute the platform of the trailer, and upstanding header supporting means adapted to be individually mounted on each of said side members in fore and aft locations to receive load-carrying headers, said header supporting means having attachment fittings thereon adapted to be removably secured to said side members at locations intermediate said flooring members, said header supporting means being in the form of side pieces utilized in pairs and mounted in aligned relation on said side members, each of said side pieces having a slot therein to receive a header, the slot in each side piece being so arranged with respect to the attachment fittings of the side pieces that when a side piece is installed on a structural side member of the trailer, said slot will be in alignment with the space between two flooring members, whereby a header installed in a pair of side pieces can extend downwardly between the flooring members and thereby be stabilized in the vertical position.

2. A truck for transporting items of various configuration comprising a truck body, a plurality of spaced flooring members on said body defining the platform of the truck, and a plurality of easily removable load-carrying means adapted to be placed in substantially vertical positions on said platform, said load-carrying means being shaped to receive an item of certain contour so placed so as to extend between and be supported by at least two of said load-carrying means, said means being stabilized in the vertical position by having a lower portion inserted between two adjacent flooring members, and being additionally stabilized by side pieces, each of said side pieces being provided with attachment fittings enabling it to be removably secured to said truck body at locations intermediate said flooring members, said load-carrying means and side pieces being movable to a variety of positions on said platform, whereby items of various lengths may be transported.

3. A truck as defined in claim 2 in which said side pieces are so constructed that when not being used to stabilize said load-carrying means, they may be secured in inverted, non-functional positions on said truck body so as to leave said platform unobstructed.

4. A platform utility truck for transporting objects of various shapes, said truck having structural side members, a plurality of flooring members spaced apart and extending between said side members to constitute the platform of the truck, header supporting means adapted to be mounted in aligned pairs on said side members in fore and aft locations on said truck to extend above the platform thereof, and a removable header to extend between each pair of header supporting means for supporting a load to be carried, each of said header supporting means having a slot therein arranged to coincide with the spaces between said flooring members so that a header may be placed in the slots of each pair of header supporting means and the lower portion of the header extend down between two adjacent flooring members to be stabilized thereby, the load-contacting, upper portion of each of said headers being contoured to receive the object to be transported.

5. A universal trailer having structural side members, a plurality of flooring members spaced apart and extending between the side members to constitute the platform of the trailer, upstanding header supporting means adapted to be individually mounted on each of said side members in fore and aft locations to receive load-carrying headers, said header supporting means having attachment fittings thereon adapted to be removably secured to said side members at locations intermediate said flooring members, said header supporting means being utilized in pairs, mounted in aligned relation on said side members, and a removable header supported by each pair of header supporting means, and stabilized in a load-carrying position by said spaced flooring members.

6. A trailer as defined in claim 5 in which said header supporting means are so constructed that when not being utilized for supporting a header, they may be secured in inverted, non-header receiving positions on said side members, whereby the header supporting means will not obstruct the platform of the trailer.

7. A universal trailer for transporting loads of various configuration comprising a flat trailer body having structural side members, upstanding header supporting means removably mounted on said side members for supporting and stabilizing removable load-carrying headers, means on said trailer body for receiving said supporting means in any of a number of selected positions for accommodating loads of various lengths, said supporting means being utilized in pairs, mounted in aligned relation on opposite sides of said trailer, with an easily removable header extending from side to side on said trailer between each aligned pair of supporting means, said headers each having a load-contacting upper portion, and a lower portion extending between said structural side members, and spaced means on said trailer for engaging opposite faces of said lower portion of each header to stabilize it in the selected load-carrying position.

References Cited in the file of this patent

UNITED STATES PATENTS

| | | |
|---|---|---|
| 1,704,662 | Flannery | Mar. 5, 1929 |
| 1,889,350 | Cohen-Venegian | Nov. 29, 1932 |
| 2,115,440 | Black | Apr. 26, 1938 |
| 2,664,715 | Sammis | July 7, 1953 |
| 2,763,383 | McCoy | Sept. 18, 1956 |
| 2,808,157 | Terrill | Oct. 1, 1957 |

FOREIGN PATENTS

| | | |
|---|---|---|
| 1,111,088 | France | Oct. 26, 1955 |
| 135,751 | Great Britain | Dec. 4, 1919 |
| 279,811 | Switzerland | Mar. 17, 1952 |